United States Patent [19]

Staffin et al.

[11] 4,161,389

[45] Jul. 17, 1979

[54] FLUIDIZED BED CALCINING SYSTEM

[75] Inventors: Herbert K. Staffin; Robert Staffin, both of Colonia, N.J.

[73] Assignee: Procedyne, Inc., New Brunswick, N.J.

[21] Appl. No.: 894,240

[22] Filed: Apr. 7, 1978

[51] Int. Cl.² .............................................. F27B 15/00
[52] U.S. Cl. .................................... 432/58; 55/341 PC
[58] Field of Search ................. 432/14, 15, 58; 34/10; 55/302, 341 PC

[56] References Cited

U.S. PATENT DOCUMENTS

| | | | |
|---|---|---|---|
| 2,391,534 | 12/1945 | Yerrick et al. | 55/341 PC |
| 2,795,860 | 6/1957 | Wright et al. | 34/12 |
| 3,930,800 | 1/1976 | Schoener et al. | 432/15 |

Primary Examiner—John J. Camby
Attorney, Agent, or Firm—Leonard S. Knox

[57] ABSTRACT

Disclosed is a method and apparatus for calcining or heat treating finely divided solids to effect a change in physical and/or chemical properties and, in so doing and prior to exhaust, filtering out particles entrained in the exhaust.

4 Claims, 6 Drawing Figures

FLUIDIZED BED CALCINING SYSTEM

BACKGROUND OF THE INVENTION

In many cases the size of the particles being calcined or heat treated are less than 100 microns and in some of these cases the particle size is less than 10 microns.

In a typical application, variously termed calcining, heat treating or heat conditioning, the process may involve driving off volatiles, reacting or cross-linking the molecules of the solids or causing a change in molecular or crystalline structure due to rearrangement or phase change.

In most of these processes, it is important to transfer heat into the finely divided solids at a uniform rate. Moreover, in many of these situations, it is also necessary to remove a volatile that has been driven out of the particles.

For the processing referred to, various types of commercial furnaces have been employed, e.g. rotary kiln furnace, rotary hearth furnace, fluidized bed furnace and others.

The fluidized bed furnace is of particular interest for heating finely divided solids for the reason that, among its major characteristics, it provides very uniform heating and a relatively high rate of heat transfer into the particles. Generally, a fluidized bed furnace passes a gas upwardly through a gas-distributor plate containing ports to diffuse gas coming from a plenum chamber located below into and through the finely divided solids at flow rates sufficiently high to separate the solids from each other and to impart mobility to the solids constituting the bed. When this occurs, the bed becomes fluid-like in appearance and behaviour. The resulting milieu, termed gas-fluidized solids, is characterized by high convective rates of heat transfer from particle to particle as well as with respect to a heated or cooled surface with which the particles may be in contact.

The fluidized bed furnace has met with some commercial success in the heating of finely divided solids to effect a change in physical or chemical properties. In many of these applications, the temperatures involved are comparatively high, typically in the range of from about 200° F. to about 2000° F.

One major disadvantage which has limited the use of fluidized bed furnaces for these applications, particularly for products having a particle size distribution which includes a significant percentage of particles less than 100 microns, is that the fluidizing gas discharging from the bed, inevitably entrains a significant quantity of particles. This requires that the discharging gas be passed through one or more pieces of equipment, such as a baghouse filter, a wet scrubber, an electrostatic precipitator or equivalent, for particle removal. For operating temperatures above 350° F., some of these approaches relying upon gas clean-up, are either not applicable or are extremely expensive.

SUMMARY OF THE INVENTION

The present invention relates to a method and system incorporating a fluidized bed furnace for heating the finely divided solids, equipped with a high-temperature filtration apparatus to remove the particles from the fluidizing gas discharging from the bed. The system disclosed is applicable at temperatures in excess of about 200° F. to about 2000° F.

The particles entrained in the discharging stream are passed through filter units which are blown back at intervals, under manual or automatic control. These units are preferably of a type utilizing gas-permeable tubular shells arranged to be moved singly and successively between filtering and blow-back positions, at which latter position a filter can be cleaned to permit it to re-enter the filtering cycle. That is to say, assuming two stations, one is actively filtering while the other is being blown back to effect a cleaning.

DESCRIPTION OF PREFERRED EMBODIMENT

Figure 1:
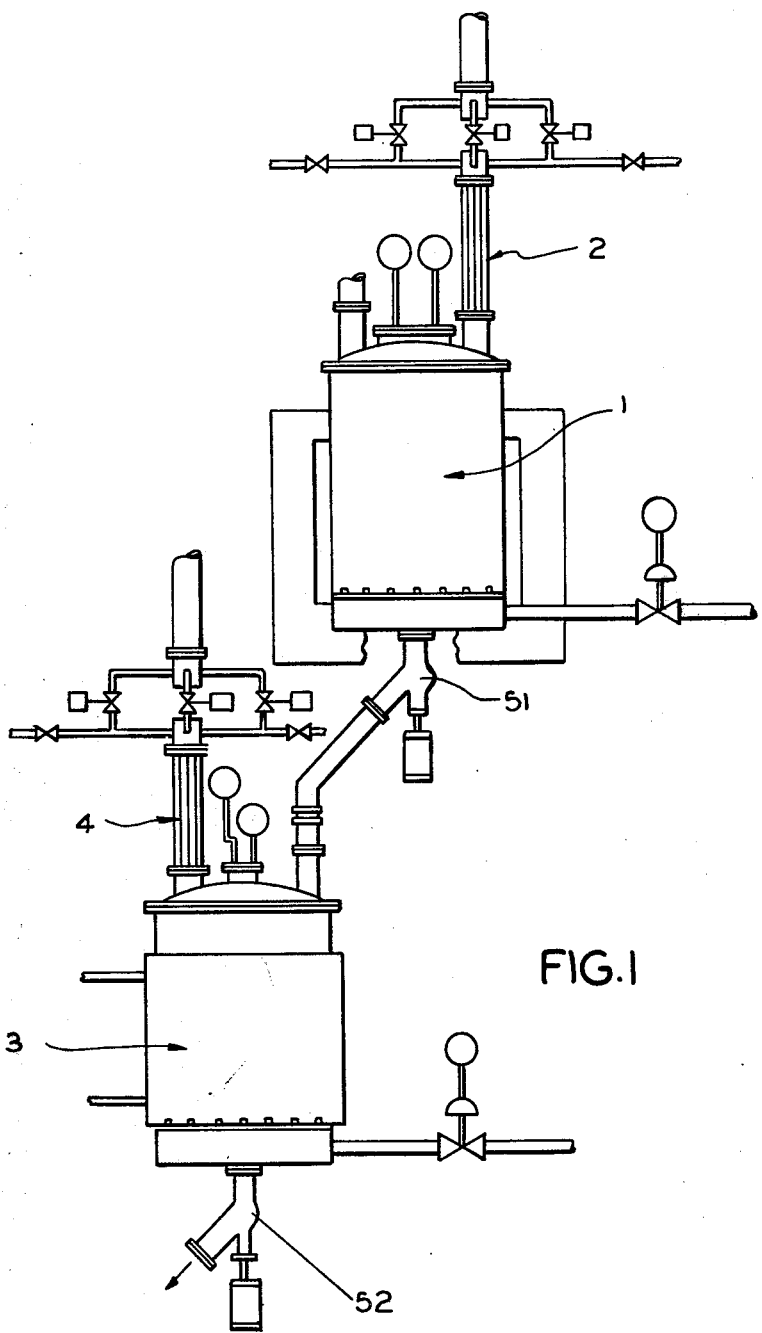
FIG. 1 is an assembly of the preferred apparatus showing a fluidized bed calciner, its high temperature filter system, a fluidized bed cooler, and its high temperature filter system.

Turning first to FIG. 1, there is shown a basic type of fluidized bed calciner 1, capable of fluidizing and uniformly heating granular solids from ambient temperature to about 2000° F. using electrical heating or full fired heating. The fluidized bed calciner is equipped with a high temperature filter system 2 which prevents particulate fines from discharging to atmosphere. The fluidized bed calciner 1 is discharged through valve 51, to fluidized bed cooler 3 at the completion of the heating cycle. The fluidized bed cooler is equipped with a high temperature filter system 4 which prevents particulate fines from discharging to atmosphere. The fluidized bed cooler is discharged through valve 52 at the completion of the cooling cycle.

Figure 2:
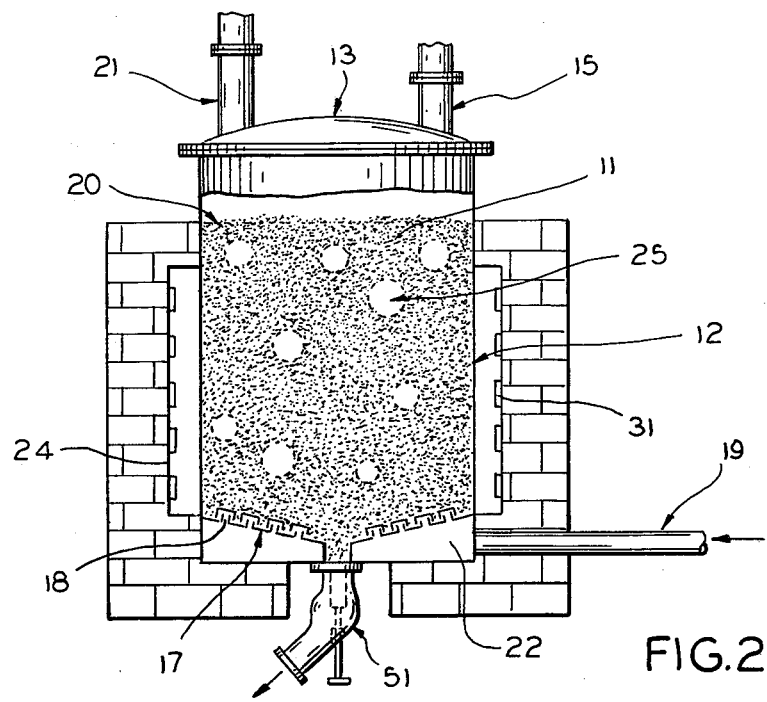
FIG. 2 shows a diagrammatic view of a typical fluidized bed calciner.

FIG. 2 shows a typical fluidized bed calciner comprising a chamber 11 defined by a sidewall 12 and a dome-shaped roof 13 reducing to an exhaust duct 15, through which the off-gases are discharged. The floor 17 of the chamber 11 has a feed line 19 through which fluidizing gas enters a plenum chamber 22 and thence is delivered, via ports 18, into the bed. From there, the gas diffuses upwardly through the particles being calcined sometimes causing void spaces or "bubbles" 25. During operation, heat is supplied to the particles of the bed, e.g. by electric heating elements 31, such as resistance elements of helical form fastened to an insulating wall 24 in a manner radiating heat to sidewall 12. Alternatively, heat may be furnished by a fuel-fired source. It will be understood that the ports 18 are so designed and the gas pressure so regulated as to preclude particles from leaving the bed in the reverse direction.

In a batch calcining process, the particles to be calcined are fed through port 21 until a suitable operating level 20, is attained, the discharge valve being closed. Feed port 21 is then closed by a valve (not shown) and the fluidizing gas is admitted through line 19 and the heating means started. After conclusion of the calcining cycle, valve 51 is opened to discharge the product from the calciner.

In the continuous process, feed solids are added continuously to the bed through feed port 21 and the calcined product is continuously withdrawn either through discharge valve 51 or through another discharge port (not shown) located in the side wall 12.

The fluidizing gas leaving the calciner through the port 15 contains some entrained particles, particularly those of a smaller-than-average size, termed fines. This exiting fluidizing gas is fed to the high temperature filter system shown in detail in FIGS. 3, 4 and 5.

Figure 3:
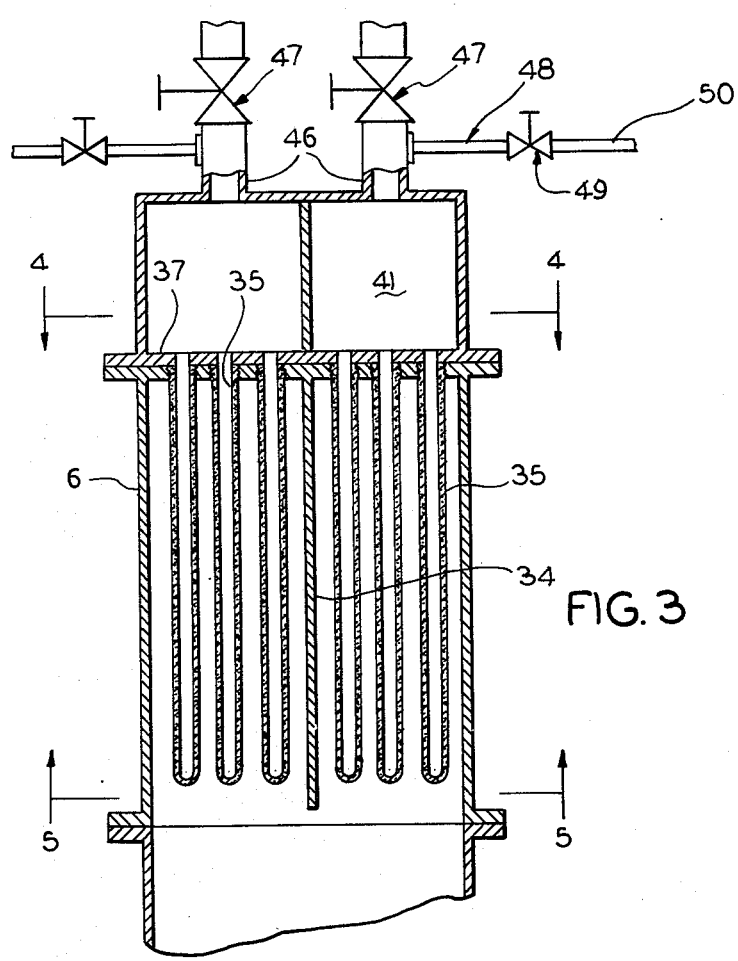
FIG. 3 is a vertical medial cross section through the high temperature filter system.

The fluidizing gas together with entrained solids enters the housing 6 of the filter unit (FIG. 3). In the example, the housing is subdivided by partitions 34 into four (more than two) cylindrical, longitudinally-segmental spaces 32. Each space 32 contains a plurality of gas-permeable tubes 35, fabricated, for example, of sintered stainless steel, bronze or equivalent. These tubes are closed at the bottom and open at the top. Typically, the tubes are mounted at the top 35 in a manifold plate 37.

In operation, the fluidizing gas discharge containing entrained solids, flows from the exterior of the tubes 35, deposits the solids on the exterior thereof and then flows into the interior. After leaving the interior of the tubes, the gas flows into the collection chamber 41 wherefrom the gas, now particle-free, discharges from the system via outlets 46 and flow-control valves 47.

When the quantity of solids adhered to the porous tubes 35 exceeds a predetermined thickness, the pressure drop of the gas transiting the tube wall reaches a point where it becomes excessive and starts to throttle the flow to an intolerable level. The tubes 35 are then cleaned by reversing the flow of gas through the porous tubes in one or more of the tubes. This is accomplished by closing a valve 47 and opening a valve 49 in a line 50 connected to a higher pressure clean gas supply. This forces gas flow through valve 49, through 48, and into chamber 41 and back through line the porous tubes 35 connected to collection chamber 41 of the tubes being back blown for cleaning.

The particles blown back from the surface of the porous tubes 35 is usually slightly agglomerated from the filtration pressure. This makes its effective particle size somewhat larger. Accordingly, the particles are blown off the tubes into housing 6, wherefrom they drop back through the port 15 (FIG. 2) counter to the flow of fluidizing gas and then drop back into the calciner to continue the calcination process.

Figure 4:
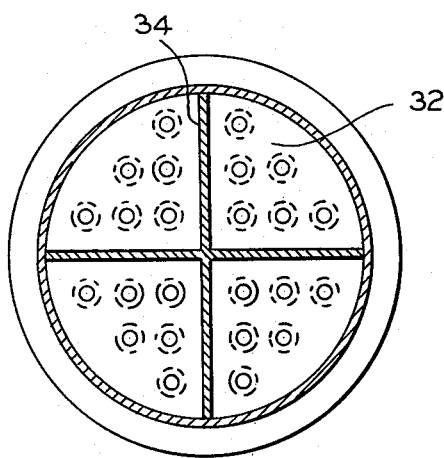
FIG. 4 is a cross section on the line 4—4 of FIG. 3.
Figure 5:
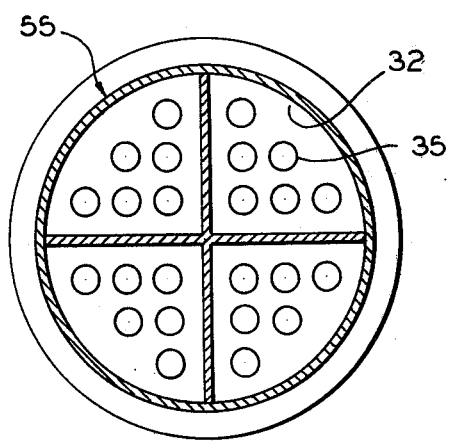
FIG. 5 is a cross section on the line 5—5 of FIG. 3.

FIGS. 3, 4 and 5 illustrate a typical high temperature filter system based on a four-section arrangement, wherein one 90° segments 55 is being cleaned by blow-back while the remaining three segments are on line for filtering. In the case of a timed cycle, the blow-back is advanced one section by opening and closing suitable valves 47 and 49 and the cleaned section is restored to the line, with the other two sections again providing one section blowing back and three filtering. In this fashion, blow-back is applied successively to each section, thus enabling the system to attain a steady state with respect to filtration. A typical stepping cycle is from 1 to 10 minutes depending upon the concentration and filtration characteristics of the entrained solids. The required stepping and dwell motion may be obtained, for example, by the use of a synchronous camtimer operating solenoid valves.

The approach just described enables operation of the fluidized bed without discharge of entrained solids from the system and consequent pollution of the atmosphere. Further, it makes possible re-cycling of the gas discharging from the system back to the plenum chamber of the calciner when advantageous, whereby atmospheric discharges and loss of energy are avoided.

Figure 6:
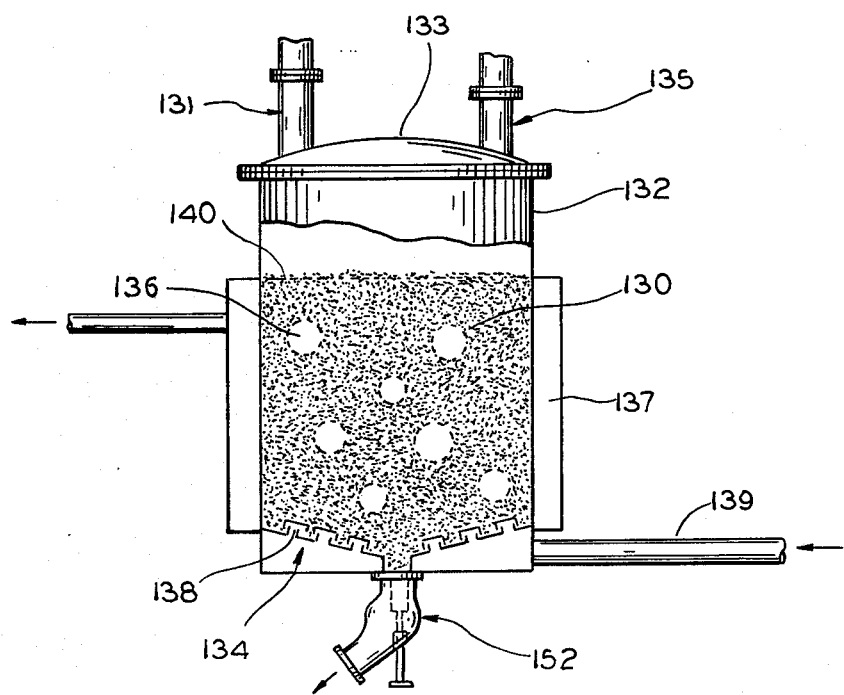
FIG. 6 shows a diagrammatic view of a typical fluidized bed cooler.

FIG. 6 illustrates a typical fluidized bed cooler comprising a chamber 30 defined by a sidewall 32 and dome-shaped roof 33 reducing to an exhaust duct 35, through which the off-gases are discharged. The floor of the chamber 11 has a feed line 139 through which fluidizing gas enters a plenum chamber 134 and thence is delivered, via ports 138, into the bed. From there, the gas diffuses upwardly through the particles being cooled which sometimes causes void spaces or "bubbles" 136. During operation, heat is removed from the particles of the bed, e.g. by a cooling medium circulating in a jacket 37.

It will be understood that the ports 138 are so designed and the gas pressure so regulated as to preclude particles from leaving the bed in the reverse direction.

In a batch cooling process, the particles to be calcined are fed through port 31 until a suitable operating level 40 is attained while discharge valve 152 is closed. Feed port 131 is then closed by means of a suitable valve (not shown) and flow of fluidizing gas is initiated through line 139 and flow of cooling medium is started. After conclusion of the cooling cycle, discharge valve 152 is opened to discharge the product from the cooler.

In the continuous process, feed solids are added continously, withdrawn either through discharge valve 52 or through another discharge port located in sidewall 132.

The fluidizing gas leaving the cooler through port 135 contains some entrained particles, fines, particularly those of a smaller than average size. This exiting fluidizing gas is fed to the high temperature filter system shown in detail in FIGS. 3, 4 and 5. This operation is identical to that previously described for the fluid bed calciner.

Although not shown, the continous calciner and continuous cooler are internally baffled to provide a circuitous path from feed to discharge, whereby to result in a narrow residence-time distribution curve, i.e. a very uniform time-temperature experience for all of the product.

We claim:

1. Filter apparatus for filtering the off-gas from the bed of a fluidized bed calcining system for heating granular solids comprising at least one fluidized bed reactor to receive a charge of solids, means to heat the solids, and means to force a gas through the solids, said filter apparatus comprising a plurality of gas-permeable filter elements interposed in the path of the stream of off-gas so arranged that some of the elements are in filtering phase while other elements are in blow-back phase for cleaning the elements, a station including means to blow back the filter elements, and means to intermittently skip the filter elements past the blow-back station to alternate the filter elements between filtration and blow back phase according to a predetermined cycle to maintain continuous filtering performance.

2. The combination in accordance with claim 1 further characterized in that the system comprises a second fluidized bed reactor provided with means to transfer the charge from the first bed to the second bed, and means associated with the second bed to cool the contents of the second reactor prior to filtering the off-gas.

3. Apparatus in accordance with claim 1 further characterized in that the filter elements comprise a plurality of tubes of gas-permeable material interposed in the gas stream to block passage of particles through the wall of the tubes.

4. The combination in accordance with claim 2 characterized by means to filter the off-gas from the bed the filter element comprises a plurality of gas-permeable material interposed in the so arranged that some of the elements are in filtering phase while other elements are in blow-back phase for cleaning, a station including means to blow back the filter elements and means to intermittently skip the filter elements past the blow-back station to alternate the filter elements between filtration and blow back according to a predetermined cycle to maintain continuous filter operation.

* * * * *